United States Patent
Liu et al.

(10) Patent No.: US 8,884,885 B2
(45) Date of Patent: Nov. 11, 2014

(54) TOUCH PAD, METHOD OF OPERATING THE SAME, AND NOTEBOOK COMPUTER WITH THE SAME

(75) Inventors: Xiangtao Liu, Beijing (CN); Lei Ma, Beijing (CN)

(73) Assignees: Beijing Lenovo Software Ltd. (CN); Lenovo (Beijing) Limited (CN)

( * ) Notice: Subject to any disclaimer, the term of this patent is extended or adjusted under 35 U.S.C. 154(b) by 1309 days.

(21) Appl. No.: 12/317,075

(22) Filed: Dec. 18, 2008

(65) Prior Publication Data

US 2009/0160800 A1    Jun. 25, 2009

(30) Foreign Application Priority Data

Dec. 19, 2007    (CN) .......................... 2007 1 0179874

(51) Int. Cl.
- G06F 3/041    (2006.01)
- G06F 21/36    (2013.01)
- G06F 21/83    (2013.01)
- G06F 3/0488   (2013.01)

(52) U.S. Cl.
CPC .............. *G06F 3/0416* (2013.01); *G06F 21/36* (2013.01); *G06F 21/83* (2013.01); *G06F 3/04883* (2013.01)
USPC ...................................... 345/173; 178/18.03

(58) Field of Classification Search
USPC .......... 345/173–179; 178/18.01–18.09, 18.11
See application file for complete search history.

(56) References Cited

U.S. PATENT DOCUMENTS

| | | | |
|---|---|---|---|
| 6,509,847 B1 * | 1/2003 | Anderson ....................... | 341/34 |
| 2006/0055679 A1 * | 3/2006 | Grinshpoon et al. ......... | 345/173 |
| 2007/0152977 A1 * | 7/2007 | Ng et al. ....................... | 345/173 |

FOREIGN PATENT DOCUMENTS

CN           1598750 A        3/2005

* cited by examiner

*Primary Examiner* — Stephen Sherman
(74) *Attorney, Agent, or Firm* — Schwegman Lundberg & Woessner, P.A.

(57) ABSTRACT

The present invention relates to the field of touch pad. In particular, there is provided a touch pad comprising a storage unit, a sensing electrode array unit and a processing unit. A trace graph composed of coordinate values of positions on the sensing electrode array unit, touched by a user in the course of operating the touch pad is recorded; comparison is made between the trace graph and a graphical password to generate a comparison value. Since the touch pad is provided with the function of recognizing the graphical password, a computer can use it to input graphical password, text password, and various characters in various states such as BIOS state and a variety of OS states, which can enhance the security of devices such as computers and make the product more interesting and easy to use.

11 Claims, 9 Drawing Sheets

TOUCH PAD, METHOD OF OPERATING THE SAME, AND NOTEBOOK COMPUTER WITH THE SAME

RELATED APPLICATIONS

This application claims the benefit of priority, under 35 U.S.C. Section 119, to Chinese Patent Application Ser. No. 200710179874.8, filed on Dec. 19, 2007, which is incorporated herein by reference in its entirety.

BACKGROUND OF THE INVENTION

1. Field of Invention

The present invention relates to the field of computer and, in particular, to the field of touch pad.

2. Description of Prior Art

Nowadays, most notebook computers use touch pads as a component for realizing function selection such as "cursor navigation", "selection" and "confirmation". Typically, this component is based on capacitive sensing principle and is structured by designing and fabricating some electrodes on an upper surface of a PCB board and then placing a plastic board over the surface of the electrodes. With this structure, when a user draws on the plastic board with a finger or a touch pen, capacitance values at the electrodes will change accordingly. Consequently coordinate values of the finger or the touch pen on the PCB board and changes of these coordinate values can be detected. By mapping the detected coordinate values onto proper positions on a display screen, functions such as "cursor navigation" can be realized. Furthermore, currently known touch pads also include resistive touch pad and electromagnetic touch pad. Direct pressing is required by the resistive touch pad at the time of touching, and a dedicated electromagnetic pen is required by the electromagnetic touch pad.

For a long time, the touch pad has become a standard accessory of most notebook computers for its advantages such as stable performance and convenient operation. However, after so many years of development, this component still remains as a simple input device for computer without any additional computing and processing function in itself. For instance, it can not store certain specific operating data input by a user. It can not compare current operating data input by a user and those input by the user previously; therefore it can not make decision according to the comparison result. It can not identify different users, for example, by using graphical password technology. Specifically, when using the graphical password scheme, a user should draw a specific symbol on the touch pad in advance and use it as the data for identifying himself/herself. If the user wants to use the touch pad once again, he/she must first input the correct symbol. Only when the input symbol is authenticated, the touch pad can be used. In addition, this component itself does not have handwriting recognition capability; therefore it can not be used to input a corresponding password when a computer using this component is in a BIOS state.

In addition, certain specific operating data input by a user via the touch pad are stored and processed by recognition software running on a computer. Therefore, it is possible to identify different users by calculating and comparing the certain specific operating data input by the different users, and thus graphical password scheme works. However, this function only works after the computer has been booted up and begins to run the corresponding recognition software. In the course of booting up the computer or when the computer enters into the BIOS state, this function can not work.

SUMMARY OF THE INVENTION

An object of the present invention is to provide a touch pad having a function of recognizing a graphical password, a method of operating such a touch pad, and a notebook computer with such a touch pad.

According to an aspect of the present invention, there is provided a touch pad comprising a storage unit, a sensing electrode array unit and a processing unit. The storage unit is used for storing a graphical password. The sensing electrode array unit includes at least one electrode, and the sensing electrode array unit is used for detecting initial values of the at least one electrode while the touch pad is not operated by a user, and for detecting first values of the at least one electrode while the touch pad is operated by the user. The processing unit is connected to the sensing electrode array unit and the storage unit, and is used for comparing the initial values with the first values and generating first comparison values, determining coordinate values corresponding to positions of the at least one electrode based on the first comparison values during the touch pad is operated by the user, recording a trace graph, and comparing the trace graph with the graphical password and generating a second comparison value.

Preferably, the processing unit comprises a first comparing unit for comparing the initial values with the first values and generating the first comparison values, a first processing unit for determining the coordinate values corresponding to the positions of the at least one electrode based on the first comparison values during the touch pad is operated by the user, a recording unit for recording the trace graph, and a second comparing unit for comparing the trace graph with the graphical password and generating the second comparison value.

Preferably, the processing unit further comprises a second processing unit for determining whether the touch pad can be used as an input device on the basis of the second comparison value.

Preferably, the first comparing unit and the second comparing unit may be the same or different comparing units, and/or the first processing unit and the second processing unit may be the same or different processing units.

Preferably, the touch pad further comprises a state indicating unit connected to the processing unit for indicating user's operating state.

According to another aspect of the present invention, there is provided a method for recognizing a graphical password by a touch pad, including steps of: detecting initial values of at least one electrode in a sensing electrode array unit while the touch pad is not operated by a user, and detecting first values of the at least one electrode while the touch pad is operated by the user; comparing the initial values with the first values and generating first comparison values; determining coordinate values corresponding to positions of the at least one electrode based on the first comparison values; recording a trace graph; and comparing the trace graph with a graphical password stored in a storage unit and generating a second comparison value.

Preferably, the step of comparing the trace graph with the graphical password stored in the storage unit and generating the second comparison value includes: generating the second comparison value which represents the password is matched when the trace graph and the graphical password stored in the storage unit match; or otherwise, generating the second comparison value which represents the password is not matched when the trace graph and the graphical password stored in the storage unit do not match.

Preferably, the method further comprises determining whether the touch pad can be used as an input device according to the second comparison value, after the step of comparing the trace graph with the graphical password stored in the storage unit and generating the second comparison value.

According to another aspect of the present invention, there is provided a notebook computer, comprising:

a storage unit for storing a graphical password;

a sensing electrode array unit including at lease one electrode, the sensing electrode array unit detecting initial values of the at least one electrode while the touch pad is not operated by a user, and detecting first values of the at least one electrode while the touch pad is operated by the user;

a processing unit connected to the sensing electrode array unit and the storage unit for comparing the initial values with the first values and generating first comparison values, determining coordinate values corresponding to positions of the at least one electrode based on the first comparison values during the touch pad is operated by the user, recording a trace graph, and comparing the trace graph with the graphical password and generating a second comparison value, which is used to determine whether the touch pad can be used as an input device of the notebook computer;

a central processing unit connected to the processing unit via a computer bus; and a display unit connected to the central processing unit, wherein the central processing unit executes operating information input through the touch pad by the user so as to obtain an execution result and causes the display unit to display the corresponding execution result.

Preferably, the processing unit of the notebook computer comprises a first comparing unit for comparing the initial values with the first values and generating the first comparison values, a first processing unit for determining the coordinate values corresponding to the positions of the at least one electrode based on the first comparison values during the touch pad is operated by the user, a recording unit for recording the trace graph, a second comparing unit for comparing the trace graph with the graphical password and generating the second comparison value, and a second processing unit for determining whether the touch pad can be used as an input device of the notebook computer on the basis of the second comparison value.

Preferably, the first comparing unit and the second comparing unit may be the same or different comparing units, and/or the first processing unit and the second processing unit may be the same or different processing units.

The present invention provides the following advantages. Since the touch pad is provided with the function of recognizing the graphical password, a computer can use it to input graphical password, text password, and various characters in various states such as BIOS state and a variety of OS states, which can enhance the security of devices such as computers, make the product more interesting and easy to use, make the product more diversified and make the product more competitive in market.

BRIEF DESCRIPTION OF THE DRAWINGS

The advantages of the present invention will become apparent, upon review of the following description in conjunction with the accompanying drawings, in which.

DETAILED DESCRIPTION OF PREFERRED EMBODIMENTS

Detailed embodiments of the present invention will now be provided for reference. In order to set forth the present invention, these embodiments will be hereinafter described by reference to the drawings.

Figure 1:
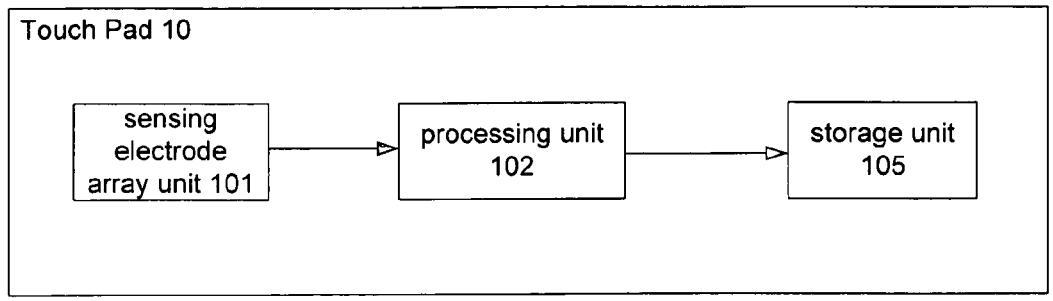
FIG. 1 is a block diagram showing a touch pad 10 according to a first embodiment of the present invention.

FIG. 1 is a block diagram showing a touch pad 10 according to a first embodiment of the present invention. In this example, the touch pad 10 is a capacitive touch pad. Those skilled in the art will appreciate that the touch pad 10 may also be a resistive touch pad, an electromagnetic touch pad, or any other type of touch pad. Referring to FIG. 1, the touch pad 10 comprises a storage unit 105, a sensing electrode array unit 101 and a processing unit 102. The storage unit 105 is used for storing a graphical password. It should be understood that the storage unit 105 may also be used for storing other types of data which can be used as a password and that the storage unit 105 may be implemented as various types of readable-and-writable memory. The sensing electrode array unit 101 includes at least one electrode, and is used for detecting initial values of the at least one electrode while the touch pad is not operated by a user, and for detecting first values of the at least one electrode while the touch pad is operated by the user. The processing unit 102 is connected to the sensing electrode array unit 101 and the storage unit 105, and is used for: comparing the initial values with the first values and generating first comparison values; determining coordinate values corresponding to positions of the at least one electrode based on the first comparison values; recording a trace graph; and comparing the trace graph with the graphical password and generating a second comparison value.

Figure 2:
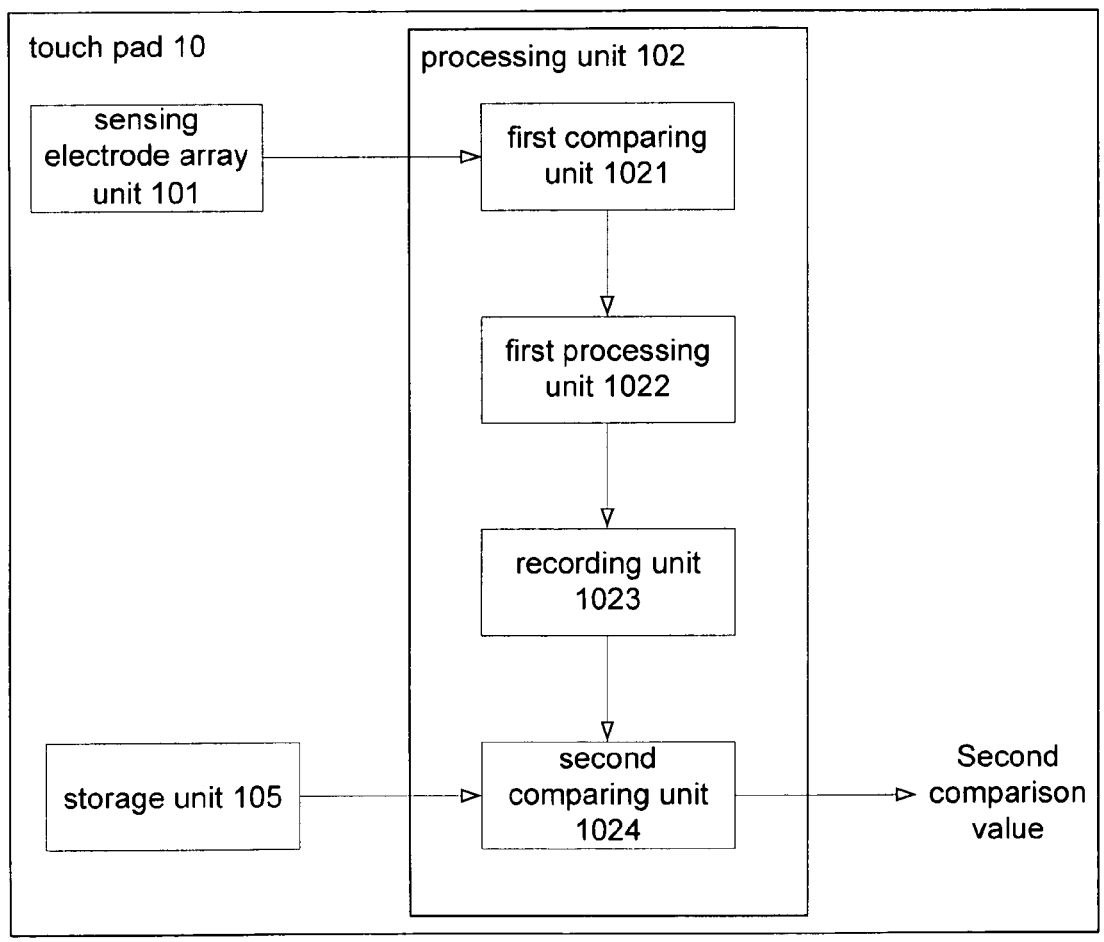
FIG. 2 is a block diagram showing sub-functional units of a processing unit 102 of the touch pad 10 according to the first embodiment of the present invention.

The function of the processing unit 102 described above may also be realized by sub-functional modules. For example, FIG. 2 is a block diagram showing the sub-functional units of the processing unit 102 of the touch pad 10 according to the first embodiment of the present invention. Referring to FIG. 2, the processing unit 102 comprises a first comparing unit 1021 for comparing the initial values with the first values and generating the first comparison values, a first processing unit 1022 for determining the coordinate values corresponding to the positions of the at least one electrode based on the first comparison values during the touch pad is operated by the user, a recording unit 1023 for recording the trace graph, and a second comparing unit 1024 for comparing the trace graph with the graphical password and generating the second comparison value.

Figure 3:
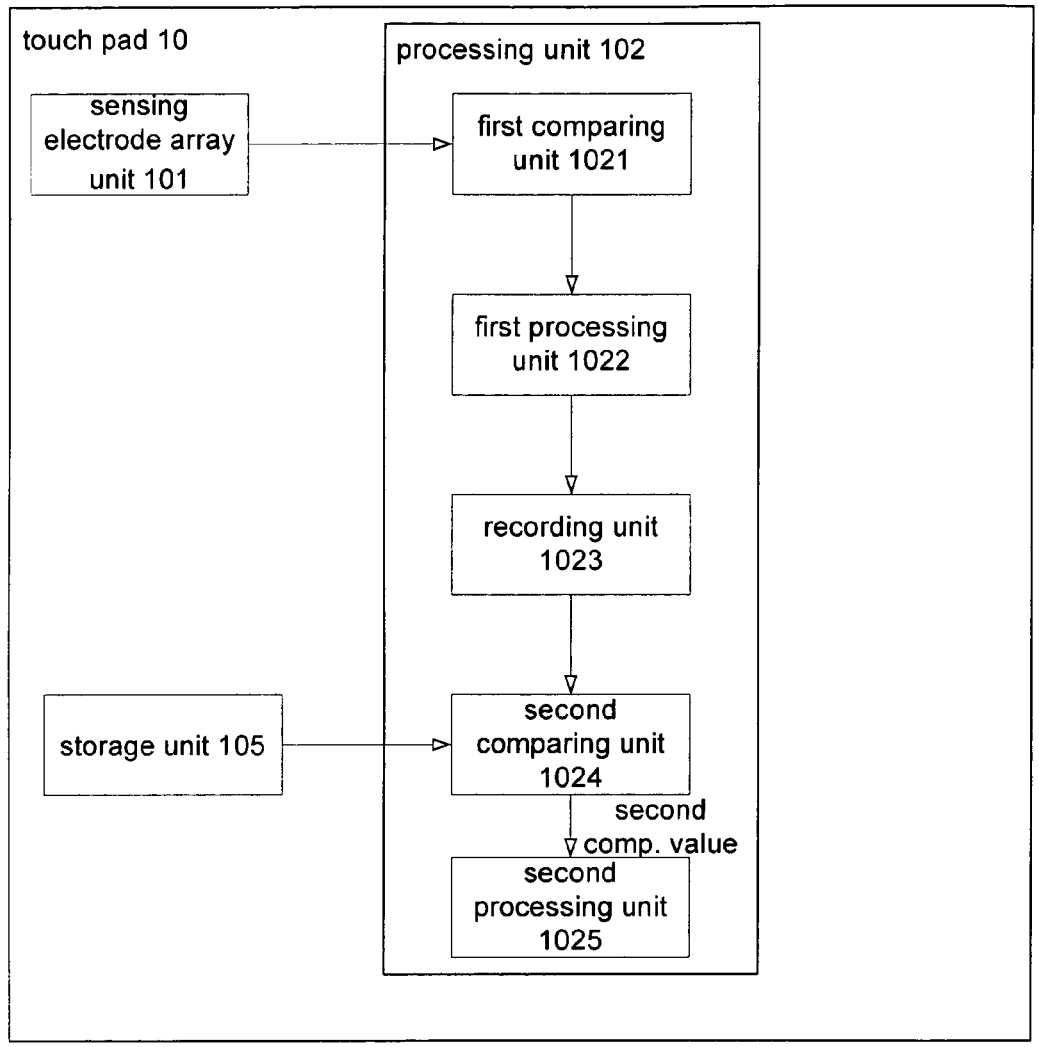
FIG. 3 is a schematic diagram showing a processing unit 102 including a second processing unit 1025.

In addition, the processing unit 102 may also include a second processing unit 1025 for determining whether the touch pad 10 can be used as an input device on the basis of the second comparison value. FIG. 3 shows a processing unit 102 including a second processing unit 1025. The embodiment shown in FIG. 2 is distinct from the embodiment shown in FIG. 3 in that the second processing unit 1025 in FIG. 3 determines whether the touch pad 10 can be used as an input device on the basis of the second comparison value without having to perform any other operation. In FIG. 3, the first comparing unit 1021 and the second comparing unit 1024 may be the same or different comparing units. Moreover, the first processing unit 1022 and the second processing unit 1025 may be the same or different processing units.

Figure 4:
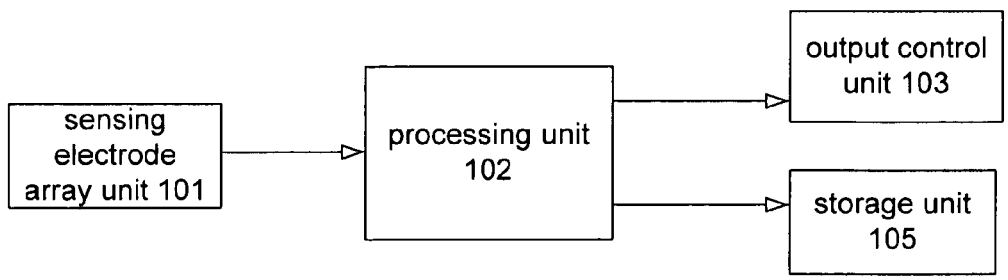
FIG. 4 is a block diagram showing a touch pad 10 according to a second embodiment of the present invention.

FIG. 4 is a block diagram showing a touch pad 10 according to a second embodiment of the present invention. As shown in FIG. 4, the touch pad 10 further comprises an output control unit 103 for receiving the coordinate values from the processing unit 102 and transmitting the coordinate values to a device using the touch pad 10.

Figure 5:
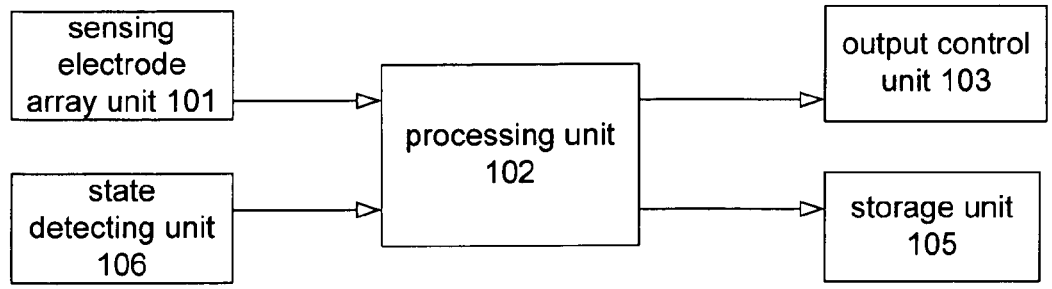
FIG. 5 is a block diagram showing a touch pad 10 according to a third embodiment of the present invention.

FIG. 5 is a block diagram showing a touch pad 10 according to a third embodiment of the present invention. As shown in FIG. 5, the touch pad 10 further comprises a state detecting unit 106 for detecting a state of a device using the touch pad 10 and inputting the state into the processing unit 102.

Figure 6:
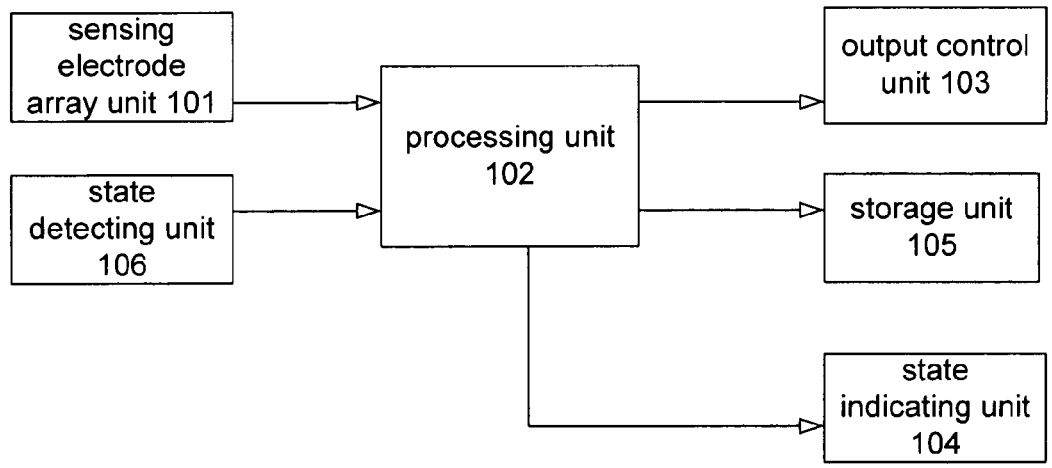
FIG. 6 is a block diagram showing a touch pad 10 according to a fourth embodiment of the present invention.

FIG. 6 is a block diagram showing a touch pad 10 according to a fourth embodiment of the present invention. As shown in FIG. 6, the touch pad 10 further comprises a state indicating unit 104 connected to the processing unit 102 for indicating user's operating state, wherein the state indication of the state indicating unit 104 may be light indication, video prompt, voice prompt, or text prompt. For example, the state indication may be some light indications such as color changes of light and flicker of light. The state indication may also be some text prompts displayed on an LED or LCD, such as "please input the password", "the password is wrong" and "the touch pad can be used normally". The state indication may also be some sound prompts such as the beep sound made by a buzzer, or the sound made by a speaker such as "please input the password", "the password is wrong" and "the touch pad can be used normally". The state indication may also be a combination of the above mentioned forms.

Figure 7:
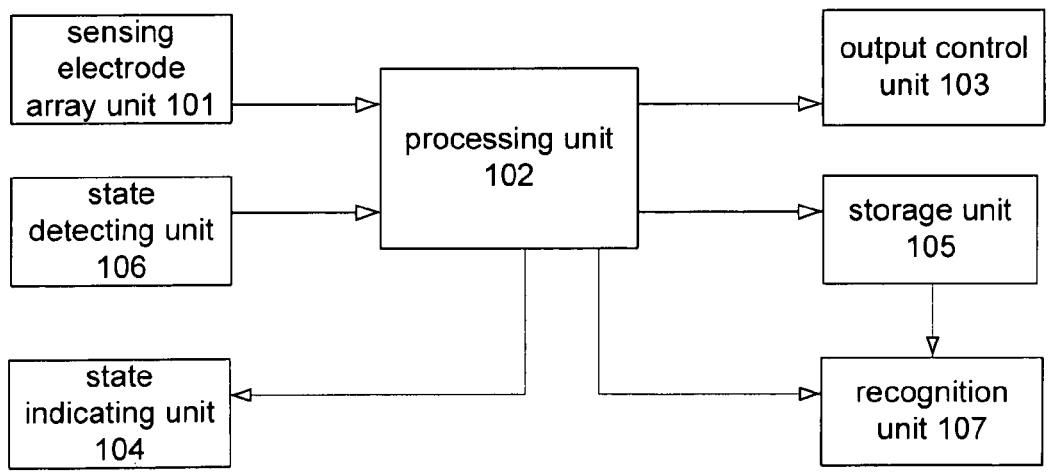
FIG. 7 is a block diagram showing a touch pad 10 according to a fifth embodiment of the present invention.

FIG. 7 is a block diagram showing a touch pad 10 according to a fifth embodiment of the present invention. As shown in FIG. 7, the touch pad 10 further comprises a recognition unit 107 for recognizing a trace graph as a graphical password by executing an algorithm for recognizing graph which is stored in the storage unit 105. In addition, the recognition unit 107 may also recognize a trace graph as text by executing an algorithm for recognizing text which is stored in the storage unit 105.

It should be understood that the processing unit 102 of the touch pad 10 according to the second, the third, the fourth, and the fifth embodiment respectively may also comprise sub-functional units like the processing unit 102 of the touch pad 10 according to the first embodiment, and repeated descriptions thereof are omitted here.

In the touch pad 10 according to the first to fifth embodiments respectively, if the second comparison value indicates the trace graph and the graphical password match, the processing unit 102 allows the user to use the touch pad 10; otherwise it will not allow the user to use the touch pad 10. The data stored in the storage unit 105 may be coordinate values of the graphical password set by the user. In addition, the data stored in the storage unit 105 may be an algorithm required for graph recognition or text recognition.

The operating principle of the touch pad 10 according to the first embodiment of the present invention will be hereinafter described in detail in conjunction with FIG. 1. The operating principle of the touch pad 10 according to the second, the third, the fourth, and the fifth embodiment of the present invention respectively is almost same, and thus detailed descriptions thereof are omitted. While we take a capacitive touch pad for example herein, it should be understood that the embodiments of the present invention may also be applied to a resistive touch pad, an electromagnetic touch pad, or any other type of touch pad. According to the capacitive sensing principle, any conductive electrode together with the ground or another conductor will form a capacitor Cp. When a finger or a human body approaches the capacitor Cp, a parasitic capacitor of the human body will be coupled to both of the capacitor plates of Cp and make the capacitance value of Cp larger. Therefore, whether or not there is a human body approaching the capacitor Cp can be determined by measuring the change of the capacitance value of Cp. Consequently, when one's finger touches the sensing electrode array unit 101, the capacitance values at the corresponding electrodes will change accordingly, and the sensing electrode array unit 101 will input this change of capacitance values to the processing unit 102. Then, the processing unit 102 generates a first reference value which represents the change of capacitances by comparing the initial values at the electrode capacitors with the values obtained after the electrodes have been touched. By analyzing and calculating the change of the respective capacitance value at each electrode, the coordinate value of the position on which the user has put his finger or the change of the coordinate value will be obtained. Next, the processing unit 102 records the trace graph composed of the coordinate values of the positions on the sensing electrode array unit 101, touched by the user in the course of operating the touch pad 10. After that, the processing unit 102 compares the trace graph and the graphical password and generates the second comparison value.

The touch pad 10 according to the embodiment of the present invention may perform various operations based on the second comparison value. For example, if the trace graph and the graphical password match, the processing unit 102 may allow the user to use the touch pad 10; otherwise it will not allow the user to use it. In the touch pad 10 according to the second embodiment, the processing unit 102 may transmit the coordinate values or the changes of the coordinate values to the output control unit 103, which in turn may realize functions such as "cursor navigation" on a computer screen by interacting with a graphics processing unit of a computer or a handheld device. In the touch pad 10 according to the third embodiment, in the case where the second comparison result indicates that the input graphical password is correct, the state detecting unit 106 provides the state of the device using the touch pad 10 to the processing unit 102. In the touch pad 10 according to the fourth embodiment, in the case where the second comparison result indicates that the input graphical password is correct, the user will be prompted that the input password is correct; otherwise the user will be prompted to input the graphical password again. In the touch pad 10 according to the fifth embodiment, the recognition unit 107 recognizes a trace graph as a graphical password by executing the algorithm for recognizing graph which is stored in the storage unit 105. In addition, the recognition unit 107 may also recognize a trace graph as text by executing the algorithm for recognizing text which is stored in the storage unit 105, and thus realize handwriting recognition by the touch pad 10.

As described above, the touch pad according to the embodiments of the present invention may be applied to a capacitive touch pad, a resistive or electromagnetic touch pad, as well as any other type of touch pad.

Figure 8:
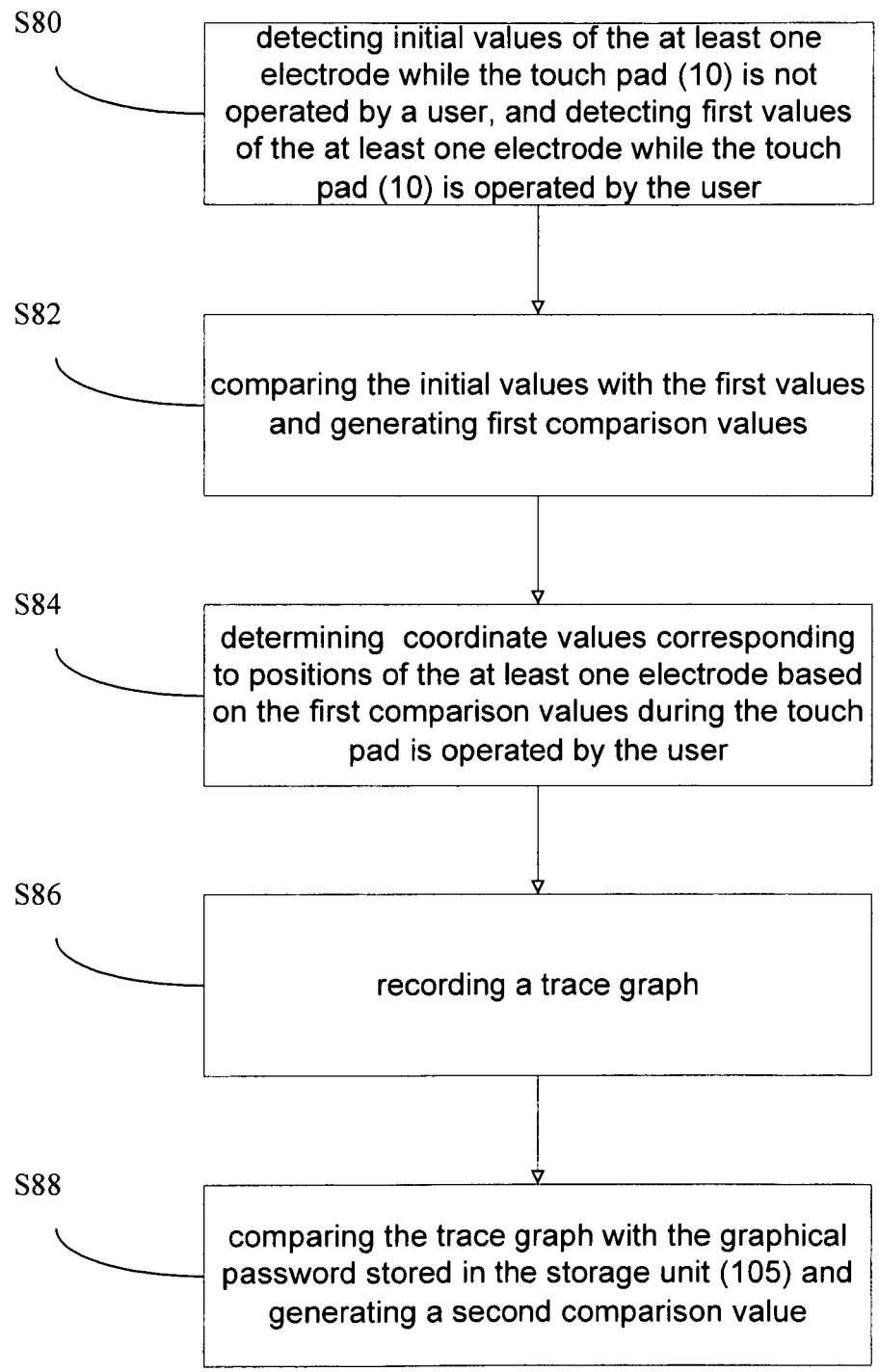
FIG. 8 is a flowchart showing a method for recognizing a graphical password by a touch pad 10 according to an embodiment of the present invention.

FIG. 8 is a flowchart showing a method for recognizing a graphical password by the touch pad 10 according to an embodiment of the present invention. Referring to FIG. 8, this method includes steps of: detecting the initial values of the at least one electrode in the sensing electrode array unit (101) while the touch pad (10) is not operated by a user, and detecting the first values of the at least one electrode while the touch pad (10) is operated by the user (S80); comparing the initial values with the first values and generating the first comparison values (S82); determining the coordinate values corresponding to the positions of the at least one electrode based on the first comparison values during the touch pad is operated by the user (S84); recording the trace graph (S86); and comparing the recorded trace graph with the graphical password stored in the storage unit (105) and generating the second comparison value (S88).

Figure 9:
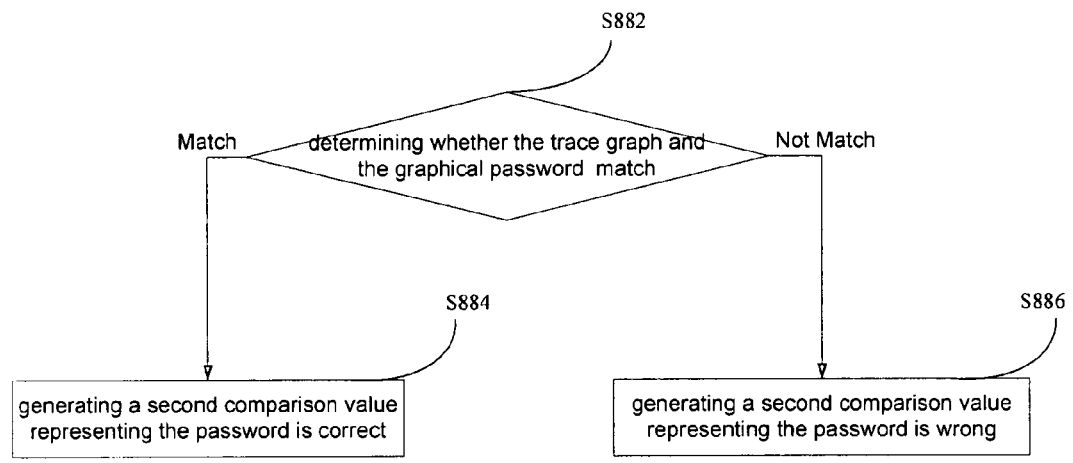
FIG. 9 illustrates details of a step for generating a second comparison value.

FIG. 9 illustrates details of the step for generating the second comparison value (S88). Referring to FIG. 9, the step of comparing the trace graph with the graphical password stored in the storage unit (105) and generating the second comparison value (S88) includes: determining whether or not the trace graph and the graphical password stored in the storage unit (105) match (S882); and generating the second comparison value which represents the password is correct when the trace graph and the graphical password stored in the storage unit (105) match (S884), or otherwise generating the second comparison value which represents the password is wrong when the trace graph and the graphical password stored in the storage unit (105) do not match (S886).

Figure 10:
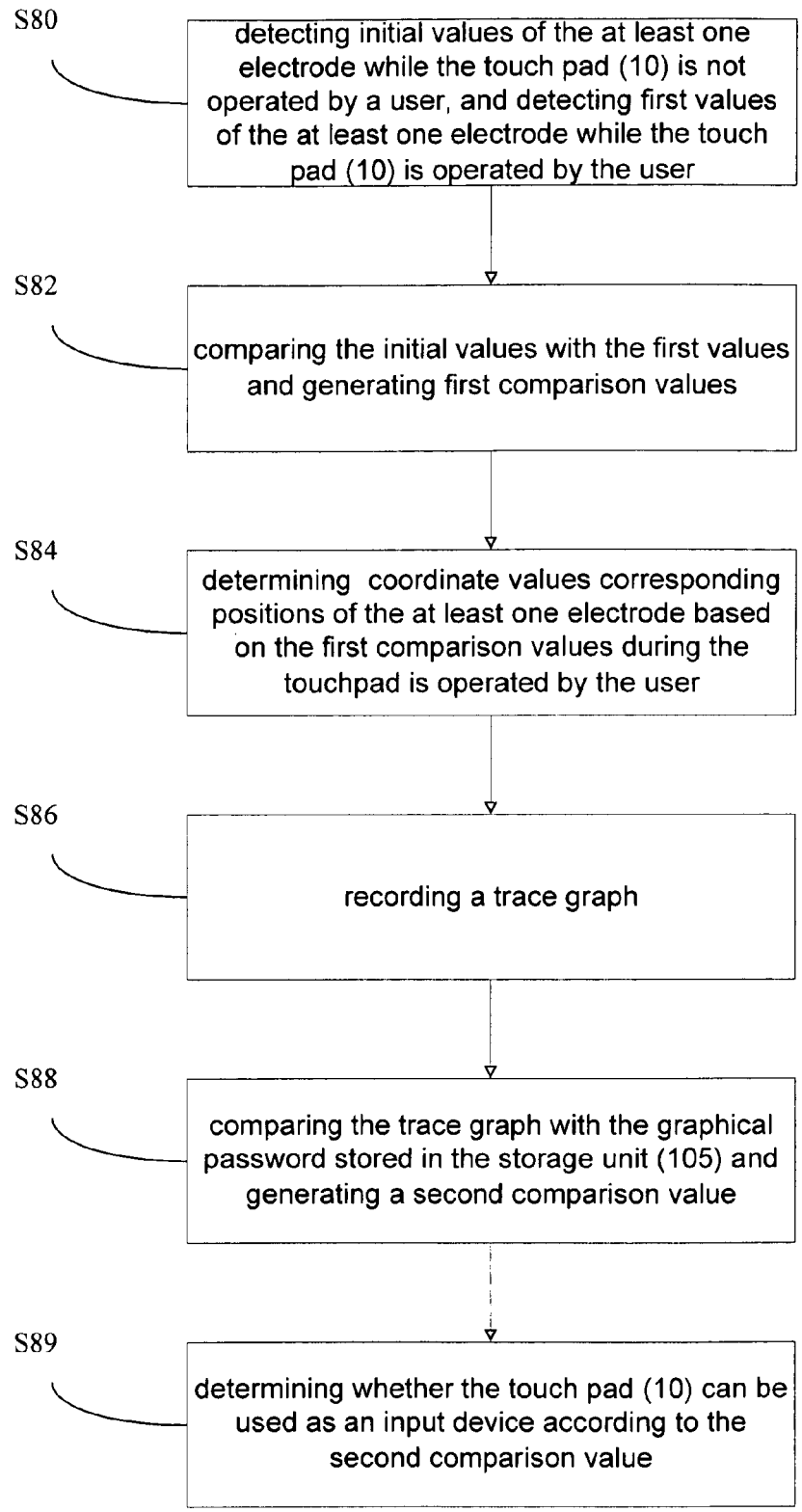
FIG. 10 is a flowchart showing a method for recognizing a graphical password by a touch pad 10 according to another embodiment of the present invention, FIG. 11 schematically illustrates a notebook computer according to the present invention.

FIG. 10 is a flowchart showing a method for recognizing a graphical password by the touch pad 10 according to another embodiment of the present invention. Referring to FIG. 10, this method comprises steps of: detecting the initial values of the at least one electrode in the sensing electrode array unit (101) while the touch pad (10) is not operated by a user, and detecting the first values of the at least one electrode while the touch pad (10) is operated by the user (S80); comparing the initial values with the first values and generating the first comparison values (S82); determining the coordinate values corresponding to the positions of the at least one electrode based on the first comparison values during the touch pad is operated by the user (S84); recording the trace graph (S86); comparing the trace graph with the graphical password stored in the storage unit (105) and generating the second comparison value (S88); and determining whether the touch pad (10) can be used as an input device according to the second comparison value (S89).

In addition, the details of the step for generating the second comparison value (S88) of the method shown in FIG. 10 is the same as those of the method shown in FIG. 9.

Figure 11:
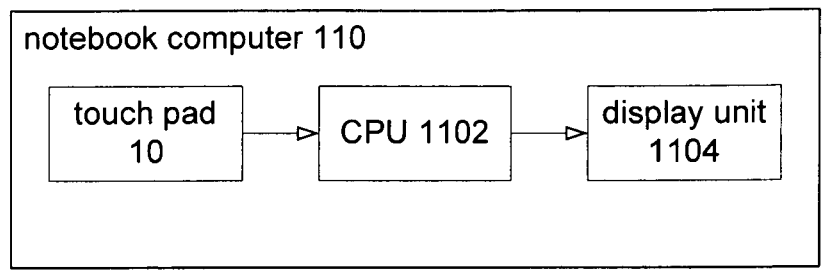

FIG. 11 schematically illustrates a notebook computer 110 according to the present invention. As shown in FIG. 11, the notebook computer 110 comprises:

a touch pad 10 according to the embodiments of the present invention described above, comprising:
a storage unit 105 for storing a graphical password,
a sensing electrode array unit 101 including at least one electrode, the sensing electrode array unit detecting initial values of the at least one electrode while the touch pad is not operated by a user, and detecting first values of the at least one electrode while the touch pad is operated by the user; and
a processing unit 102 connected to the sensing electrode array unit 101 and the storage unit 105 for comparing the initial values with the first values and generating first comparison values, determining coordinate values corresponding to positions of the at least one electrode based on the first comparison values during the touch pad is operated by the user, recording a trace graph, and comparing the trace graph with the graphical password and generating a second comparison value which is used to determine whether the touch pad 10 can be used as an input device of the notebook computer 110;
a central processing unit 1102 connected to the processing unit via a computer bus; and
a display unit 1104 connected to the central processing unit, wherein the central processing unit executes operating information input through the touch pad 10 by the user so as to obtain an execution result and causes the display unit 1104 to display the corresponding execution result,
wherein the processing unit of the notebook computer 110 comprises a first comparing unit 1021 for comparing the initial values with the first values and generating the first comparison values, a first processing unit 1022 for determining the coordinate values corresponding to the positions of the at least one electrode based on the first comparison values during the touch pad is operated by the user, a recording unit 1023 for recording the trace graph, and a second comparing unit 1024 for comparing the trace graph with the graphical password and generating the second comparison value. The processing unit 102 may further comprise a second processing unit 1025 for determining whether the touch pad 10 can be used as an input device on the basis of the second comparison value. The first comparing unit and the second comparing unit may be the same or different comparing units, and/or the first processing unit and the second processing unit may be the same or different processing units.

Figure 12:
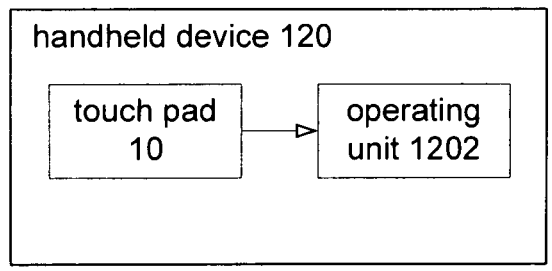
FIG. 12 illustrates a handheld device according to the present invention.

FIG. 12 illustrates a handheld device (120) according to the present invention. As shown in FIG. 12, the handheld device (120) comprises a touch pad 10 according to one of the above embodiments of the present invention, and an operating unit (1202) connected to the touch pad 10 for receiving coordinate values or trace graph from the touch pad (10).

Figure 13:
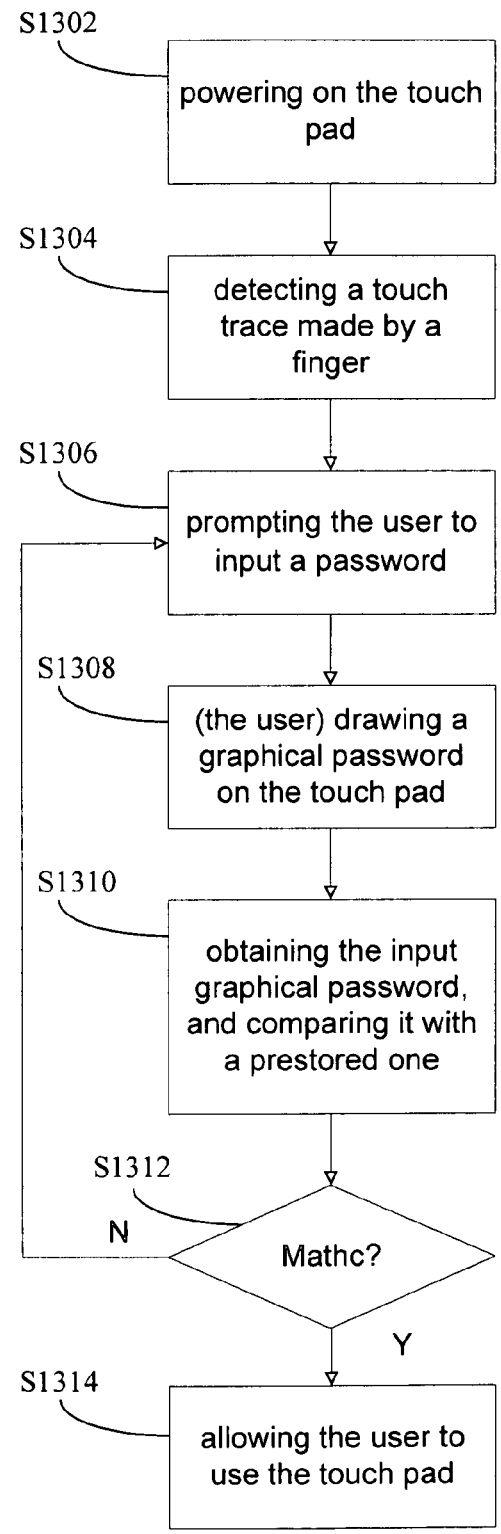
FIG. 13 illustrates an example of a method of operating a touch pad according to an embodiment of the present invention in more detail.

Below, an example of a method of operating a touch pad according to an embodiment of the present invention will be described by reference to FIG. 13 in conjunction with the touch pad according to the above embodiments. First, the touch pad is powered on (S1302). A user begins to touch the touch panel of the touch pad 10, and the processing unit 102 detects the touch trace on the touch panel made by a finger or a touch pen (S1304). Next, the processing unit 102 prompts the user to input a password (S1306). Then, the user draws a graphical password on the panel of the touch pad (S1308). The processing unit 102 obtains the coordinate values of the input graphical password by processing the graphical password and compares the obtained coordinate values with those of the graphical password prestored in the storage unit 105 (S1310). The processing unit 102 judges whether these two sets of coordinate values are the same (S1312). If the processing unit 102 determines that these two sets of coordinate values are the same which indicates that the input trace graph and the graphical password prestored match, the processing unit 102 will allow the user to use the touch pad (S1314); or otherwise, if the processing unit 102 determines that these two sets of coordinate values are not the same, the processing unit (102) will not allow the user to use the touch pad and will prompt the user to input password once again (S1306). The touch pad may also provide the user with video, voice or text prompt such as "the password is wrong", "please try again".

Figure 14:
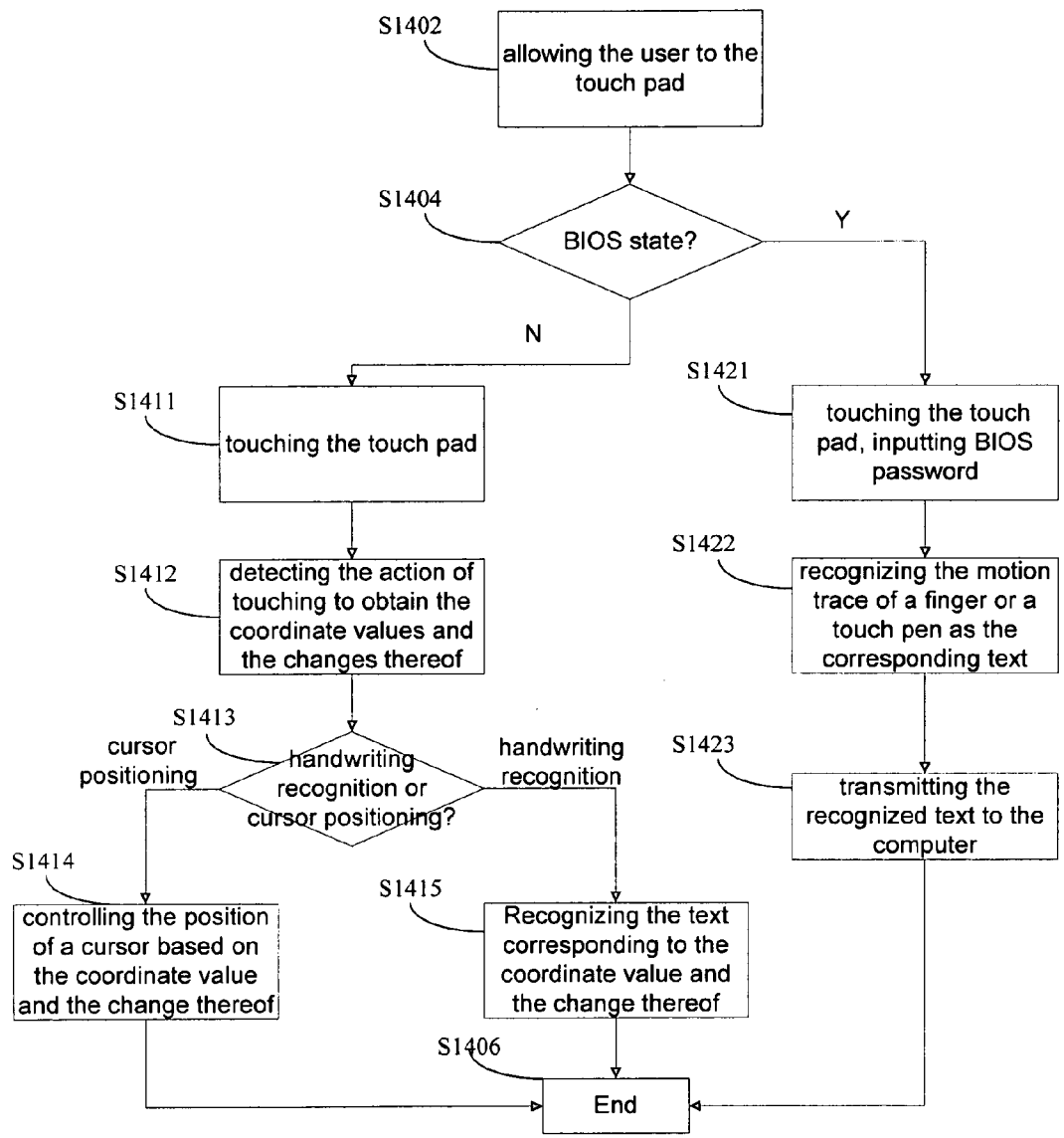
FIG. 14 illustrates another example of a method of operating a touch pad according to an embodiment of the present invention in more detail.

Below, another example of a method of operating a touch pad according to an embodiment of the present invention will be described by reference to FIG. 14 in conjunction with the touch pad according to the above embodiments. After the touch pad 10 allows the user to use the touch pad (S1402), the state detecting unit 102 detects whether the computer is in a BIOS state (S1404). If the computer is in the BIOS state, the user may input a BIOS password or the like by touching the touch panel of the touch pad 10 (S1421). And then the processing unit 102 detects the action of touching, obtains the coordinate values and the changes of the coordinate values through calculation and analysis, and recognizes the motion trace formed by the action of touching as the corresponding text (S1422). The processing unit 102 transmits the recognized text to the computer, and thus the user password can be input in BIOS state (S1423). After that the process ends (S1406). Or otherwise, if the computer is not in the BIOS state, the user touches the touch panel of the touch pad 10 (1411). And then the processing unit 102 detects the action of touching, obtains the coordinate values and the changes of the coordinate values through calculation and analysis (S1412). Next, the processing unit 102 determines whether the touch pad is in the state of handwriting recognition or in the state of cursor positioning currently (S1413). If the touch pad is in the state of cursor positioning, the processing unit 102 transmits the data corresponding to the current coordinate value and the change of the coordinate value to the computer system so as to control the position of a cursor (S1414). If the touch pad is in the state of handwriting recognition, the processing unit 102 transmits the recognized text corresponding to the current coordinate value and the change of the coordinate value to the computer system so that handwriting recognition can be realized (S1415). After that the process ends (S1406).

In addition to computer such as notebook computer, this solution may also be applied to any kind of handheld device such as mobile phone, GPS and PDA, which needs the function of "cursor navigation", "handwriting recognition".

Although several embodiments of the present invention have been shown and described, those skilled in the art should appreciate that various modifications and variations can be made to the above embodiments without departing from the spirit and scope of the present invention defined by the appended claims and their equivalents.

What is claimed is:

1. A touch pad, comprising:
   a sensing electrode array unit including a plurality of electrodes which are arranged to form an array, wherein the sensing electrode array unit is configured to detect initial values of the electrodes in the array while the user does not operate the touch pad, and detect first values of the electrodes whose physical characteristic changes while the user touches the touch pad with an input tool and moves the input tool on the touch pad;
   a storage unit configured to store a graphical password defined by coordinate values corresponding to positions of part of the electrodes; and
   a processing unit connected to the sensing electrode array unit and the storage unit, and configured to compare the initial values with the first values to generate first comparison values, determine, based on the first comparison values, coordinate values corresponding to positions of the electrodes which are touched by the user while the user moves the input tool on the touch pad and whose physical characteristic changes, record the coordinate values corresponding to the positions of the electrodes touched by the user generate a trace graph defined by the recorded coordinate values, compare the coordinate values of the trace graph with those of the graphical password to generate a second comparison value, and determine whether the touch pad can be operated by the user on the basis of the second comparison value.

2. The touch pad according to claim 1, wherein the processing unit comprises:
   a first comparing unit configured to compare the initial values with the first values to generate the first comparison values;
   a first processing unit configured to determine the coordinate values corresponding to the positions of the electrodes based on the first comparison values during the touch pad is operated by the user;
   a recording unit configured to record the trace graph; and
   a second comparing unit configured to compare the trace graph with the graphical password to generate the second comparison value.

3. The touch pad according to claim 2, wherein the processing unit further comprises:
   a second processing unit configured to determine whether the touch pad can be used as an input device by determining whether the trace graph is matched with the graphical password on the basis of the second comparison value.

4. The touch pad according to claim 3, wherein the first comparing unit and the second comparing unit are the same or different comparing units, and/or the first processing unit and the second processing unit are the same or different processing units.

5. The touch pad according to claim 1, wherein the touch pad further comprises a state indicating unit connected to the processing unit and configured to indicate user's operating state.

6. A method for recognizing a graphical password by a touch pad, the touch pad comprising a sensing electrode array unit including a plurality of electrodes which are arranged to form an array, the method including steps of:
   detecting or initial values of the electrodes in the sensing electrode array unit while the touch pad is not operated by a user, and detecting first values of electrodes whose physical characteristic changes while the user touches the touch pad with an input tool and moves the input tool on the touch pad;
   comparing the initial values with the first values to generate first comparison values;
   determining, based on the first comparison values, coordinate values corresponding to positions of the which are electrodes touched by the user while the users moves the input tool on the touch pad and whose physical characteristic changes;
   recording series of the coordinate values corresponding to the position or positions of the electrodes touched by the user, generating a trace graph defined by the recorded coordinate values;
   comparing the coordinate values of trace graph with coordinate values of a graphical password stored in a storage unit to generate a second comparison value; and determining whether the touch pad can be operated by the user on the basis of the second comparison value.

7. The method according to claim 6, wherein the step of comparing the trace graph with the graphical password stored in the storage unit to generate the second comparison value includes:

generating the second comparison value which represents the password is matched when the trace graph and the graphical password stored in the storage unit match; or otherwise generating the second comparison value which represents the password is not matched when the trace graph and the graphical password stored in the storage unit do not match.

8. The method according to claim 6, wherein the step of determining whether the touch pad can be operated by the user on the basis of the second comparison value includes:

determining whether the touch pad can be used as an input device by determining whether the coordinate values of the trace graph are matched with those of the graphical password according to the second comparison value.

9. A notebook computer, comprising: a touch pad comprising a sensing electrode array unit including a plurality of electrodes which are arranged to form an array, wherein the sensing electrode array unit is configured to detect initial values of the electrodes in the array while the user does not operate touch pad, and detecting first values of the at least one electrodes whose physical characteristic changes while the user touches the touch pad with an input tool and moves the input tool on the touch pad;

a storage unit configured to store a graphical password defined by coordinate values corresponding to positions of part of the electrodes;

a processing unit connected to the sensing electrode array unit and the storage unit, and configured to compare the initial value or values with the first value or values to generate a first comparison value or first comparison values, determine, based on the first comparison values, coordinate values corresponding to positions of the electrodes which are touched by the user while the user moves the input tool on the touch pad and whose physical characteristic changes record of the coordinate values corresponding to the positions of the electrodes touched by the user, generate a trace graph defined by the recorded coordinate values, compare the coordinate values of the trace graph with those of the graphical password to generate as a second comparison value, and determine whether the touch pad can be used as an input device of the notebook computer based on the second comparison value;

a central processing unit connected to the processing unit via a computer bus; and a display unit connected to the central processing unit, wherein the central processing unit executes operating information input through the touch pad by the user so as to obtain an execution result and causes the display unit to display the corresponding execution result.

10. The notebook computer according to claim 9, wherein the processing unit comprises:

a first comparing unit configured to compare the initial values with the first values to generate the first comparison values;

a first processing unit configured to determine the coordinate values corresponding to the positions of the electrodes based on the first comparison values during the touch pad is operated by the user;

a recording unit configured to record the trace graph;

a second comparing unit configured to compare the trace graph with the graphical password to generate the second comparison value; and a second processing unit configured to determine whether the touch pad can be used as an input device of the notebook computer on the basis of the second comparison value.

11. The notebook computer according to claim 10, wherein the first comparing unit and the second comparing unit are the same or different comparing units, and/or the first processing unit and the second processing unit are the same or different processing units.

* * * * *